United States Patent
Miyoshi et al.

(10) Patent No.: US 7,446,076 B2
(45) Date of Patent: Nov. 4, 2008

(54) EXHAUST GAS PURIFICATION CATALYST

(75) Inventors: Seiji Miyoshi, Aki-gun (JP); Akihide Takami, Hiroshima (JP); Hiroshi Yamada, Hiroshima (JP); Masaaki Akamine, Hiroshima (JP); Hideharu Iwakuni, Higashihiroshima (JP); Koichiro Harada, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 27 days.

(21) Appl. No.: 11/289,666

(22) Filed: Nov. 29, 2005

(65) Prior Publication Data

US 2006/0128562 A1 Jun. 15, 2006

(30) Foreign Application Priority Data

Dec. 10, 2004 (JP) ............................. 2004-358534

(51) Int. Cl.
*B01J 23/00* (2006.01)
*B01J 21/00* (2006.01)
*B01J 20/00* (2006.01)

(52) U.S. Cl. .................. 502/326; 502/303; 502/304; 502/327; 502/332; 502/333; 502/334; 502/339; 502/349; 502/355; 502/415; 502/439; 502/527.13

(58) Field of Classification Search .............. 502/303, 502/304, 349, 355, 415, 439, 326, 327, 332–334, 502/339, 527.13

See application file for complete search history.

(56) References Cited

U.S. PATENT DOCUMENTS

| 5,019,546 | A | 5/1991 | Murakami et al. |
| 7,022,646 | B2 * | 4/2006 | Li ............................. 502/339 |
| 2002/0049137 | A1 | 4/2002 | Morikawa et al. |
| 2003/0103886 | A1 * | 6/2003 | Dou ........................ 423/239.1 |
| 2004/0087439 | A1 * | 5/2004 | Hwang et al. ............... 502/302 |
| 2004/0234439 | A1 | 11/2004 | Takashima et al. |
| 2005/0014638 | A1 | 1/2005 | Miura |
| 2005/0164879 | A1 * | 7/2005 | Chen ......................... 502/328 |

FOREIGN PATENT DOCUMENTS

| JP | S63-258648 A | 10/1988 |
| JP | 2000-203830 A | 7/2000 |
| JP | 2001-347167 A | 12/2001 |
| JP | 2002-001120 A | 1/2002 |

OTHER PUBLICATIONS

European Search Report dated Apr. 20, 2006.

* cited by examiner

*Primary Examiner*—Cam N. Nguyen
(74) *Attorney, Agent, or Firm*—Alleman Hall McCoy Russell & Tuttle LLP

(57) ABSTRACT

Catalytic converter comprises a carrier having exhaust gas passages therein, a lower catalytic layer coated over the carrier and comprising hollow oxide powder loaded with catalytic metal, and an upper catalytic layer coated over the lower catalytic layer, directly exposed to exhaust gas flowing in the exhaust gas passages and comprising solid oxide powder loaded with catalytic metal. The hollow oxide powder may be ceria or alumina base oxide. Further it may be mixed oxide such as Ce—Zr mixed oxide or La contained alumina as well.

17 Claims, 2 Drawing Sheets

EXHAUST GAS PURIFICATION CATALYST

BACKGROUND OF THE INVENTION

This invention relates to an exhaust gas purification catalyst, more particularly to usage of hollow oxide powder for a catalytic layer.

As the catalyst for purifying exhaust gas from an internal combustion engine, it is common to use precious metals such as Pt, Pd or Rh which is loaded on oxide powder such as alumina that is referred to as support material. Alternatively ceria may be adopted as the support material as well considering its oxygen storage capacity. Further, catalytic layers having the support materials may consist of two layers as shown in U.S. Pat. No. 5,019,546 or Japanese Patent Application Publication no. S63-258648.

It is also known to use hollow oxide powder as the support material in order to enhance catalyst performance as shown in Japanese Patent Application Publication nos. 2000-203830 or 2001-347167. By using the hollow oxide powder as support material, porous volume of the catalytic layer is increased thereby enhancing gas diffusion to improve exhaust gas purification performance at high temperature.

Further, Japanese Patent Application Publication no. 2002-001120 shows that both of the hollow and solid oxide powders can be used as the support material. In the case of multi layer structure of the support material, for enhancement of the gas diffusion, it is preferred to arrange the hollow oxide powder in a layer except for the lowermost layer among the multiple layers and it is particularly preferred to arrange it in the uppermost layer.

Such a hollow oxide powder is formed by gathering together or agglutinating super fine crystals of a size of several to tens of nanometers to make spaces of its shell wall where exhaust gas may pass through. However, there is a certain level of resistance against the exhaust gas flow. Accordingly, when exhaust gas pressure is low, e.g. in an engine idle condition just after engine start, the improvement of exhaust gas purification performance by the gas diffusion can not be obtained enough. Especially, in a cold engine start condition, the hollow oxide powder contained in the upper layer of catalyst functions as a heat insulator, thereby heat transfer from the exhaust gas to the lower layer is deteriorated, and, also since heat is deprived further from the lower layer to the honeycomb-shaped carrier, temperature rise of the lower layer is delayed which is a disadvantage in terms of activation of catalyst in cold start condition (light-off performance).

Therefore, the inventors herein have recognized the above-mentioned disadvantages and have developed a method to improve the catalyst containing the hollow oxide powder.

BRIEF SUMMARY OF THE INVENTION

In one aspect of the present invention, the disadvantages of prior approaches are overcome by a catalytic converter for purification of exhaust gas from an internal combustion engine or the like. The catalytic converter comprises a carrier having exhaust gas passages therein, a lower catalytic layer positioned above the carrier and comprising hollow oxide powder loaded with catalytic metal, and an upper catalytic layer positioned above the lower catalytic layer, directly exposed to exhaust gas flowing in the exhaust gas passages and comprising solid oxide powder loaded with catalytic metal.

According to the first aspect of the invention, the upper catalytic layer directly receives heat from exhaust gas to quickly activate the catalytic material loaded on the upper layer. Simultaneously, the lower layer functions to prevent heat transfer to the carrier because of the thermal insulation effect of the hollow oxide powder. Eventually both of the functions may result advantageously in the improvement of low temperature activation of the catalytic converter as a whole.

If there are three catalytic layers or more, the hollow oxide powder may be contained in any one of the multiple layers except for the upper layer which is directly exposed to the exhaust gas, while the lower catalytic layer may be coated directly over the carrier and the upper catalytic layer may be coated directly over the lower catalytic layer.

The lower catalytic layer may further comprise solid oxide powder loaded with catalytic metal in addition to the hollow oxide powder.

In a second aspect of the present invention, another catalytic converter is provided. It comprises a carrier having exhaust gas passages therein, an upstream lower catalytic layer positioned above the carrier in a predetermined range from an upstream end of the carrier in an exhaust gas flow direction and comprising hollow oxide powder loaded with catalytic metal, a downstream lower catalytic layer positioned above the carrier downstream of the upstream lower catalytic layer and comprising solid oxide powder loaded with catalytic metal, and an upper catalytic layer positioned above the upstream and downstream lower catalytic layers, directly exposed to exhaust gas flowing in the exhaust gas passage and comprising solid oxide powder loaded with catalytic metal.

According to the second aspect of the invention, since the upstream end region of the catalytic converter first receives heat from the exhaust gas flowing through the exhaust gas passage and the hollow oxide powder is provided in the upstream lower layer which is within the predetermined range from the upstream end in the exhaust gas flow direction, catalytic activity at the upstream lower layer is excited and maintained by heat from exhaust gas and its catalytic reaction and the region showing activity with effect of the catalytic heat is spreading downstream as the exhaust gas flows. At the same time, the invention reduces use of hollow oxide powder by using it only for the upstream lower layer, which results on cost reduction while enhancing the light off performance. The range of lower layer with the hollow oxide powder may be only the proximity of the upstream end of the carrier, a range from the upstream end to a center part of the carrier in the direction of exhaust gas flow, or a range from the upstream end beyond the center part to a downstream side.

If there are three catalytic layers or more, the hollow oxide powder may be contained in any one of the multiple layers except for the upper layer which is directly exposed to the exhaust gas, while the lower catalytic layer may be coated directly over the carrier and the upper catalytic layer may be coated directly over the lower catalytic layer.

In one embodiment of the present invention, the hollow oxide powder may be ceria or alumina base oxide. Further it may be mixed oxide such as Ce—Zr mixed oxide or La contained alumina. Also, the solid oxide powder may be ceria or alumina base oxide. Further it may be mixed oxide such as Ce—Zr mixed oxide or La contained alumina as well.

In another embodiment of the present invention, the hollow oxide powder in the lower layer may carry precious metal such as Pt or Pd as the catalytic metal. Also, the solid oxide powder in the upper layer may carry precious metal such as Rh. In a case that the solid oxide powder carries Rh in the upper layer, the Rh catalyst in the upper layer promotes steam reforming reaction or partial oxidizing reaction of hydrocarbon in the exhaust gas to cause it to become more active decomposed product such as $H_2$ and partially oxidized hydrocarbon, which is provided to the lower layer to enhance catalytic reaction therein. Since that decomposed product of hydrocarbon is smaller in size compared to the original hydrocarbon, it can more easily pass through the shell wall of the hollow oxide powder in the lower layer so as to take advantage of gas diffusion in the larger porous volume of the hollow oxide powder than that of the solid oxide powder. Further in a case that the Pd catalyst is loaded on the lower layer, the hydrocarbon, which might poison Pd, is purified or converted to more reactive partly oxidized hydrocarbon at the upper layer, which may prevent deterioration of the Pd catalyst in the lower layer so as to enhance durability of the catalytic converter.

Further in the above embodiment, when Pt catalyst is loaded on the solid oxide powder of the upper layer in addition to the Rh catalyst, oxidizing reaction of high molecular hydrocarbon may be promoted at the upper layer by the Pt catalyst so as to improve exhaust gas purification performance of the catalytic converter. The Pt catalyst may also increase the production of partly oxidized hydrocarbon at the upper layer so as to enhance the reactivity of exhaust gas at the lower layer while preventing the HC poisoning of the Pd catalyst in the lower layer as described above. Further the Pt catalyst in the upper layer may promote oxidizing reaction of hydrocarbon as described above to form local reducing atmosphere which may prevent oxidization of the Rh catalyst in the upper layer, that might deteriorate its catalytic reactivity in oxidizing atmosphere.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION OF THE INVENTION

Figure 1:
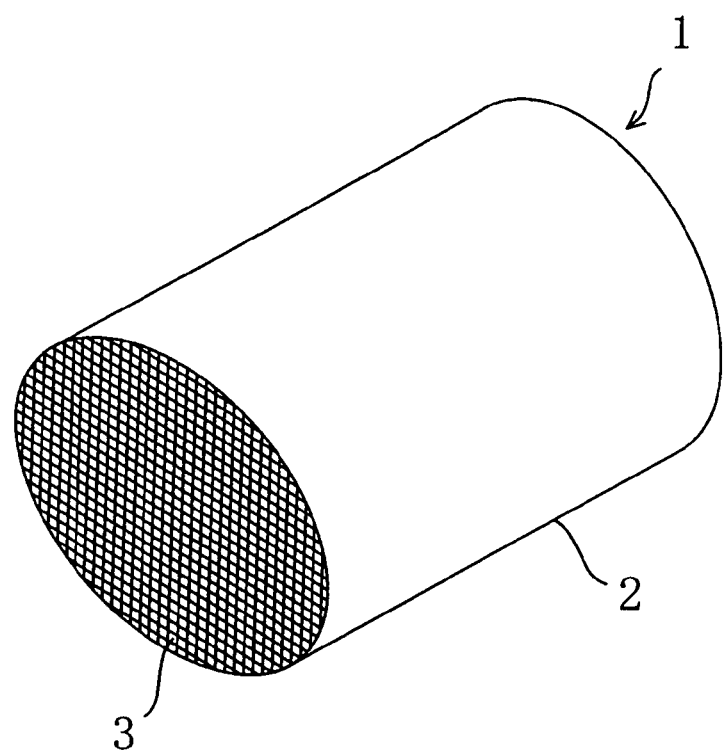
FIG. 1 is a perspective view of a catalytic converter for exhaust gas purification in accordance with the present invention.

FIG. 1 shows catalytic converter for exhaust gas purification (three way catalyst) 1 arranged in an exhaust gas passage from an internal combustion engine of an automotive vehicle. The catalytic converter 1 has porous a monolith carrier 2 having a honeycomb shaped cross section comprising a number of cells 3 forming exhaust gas passages.

Figure 2:
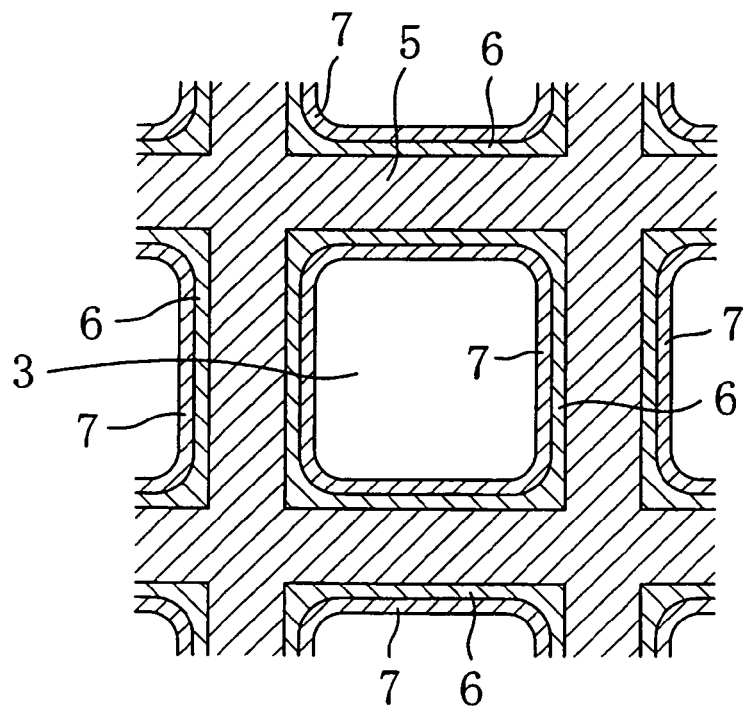
FIG. 2 is a cross sectional view showing a portion of the catalyst shown in FIG. 1.

With reference to FIG. 2, catalytic layers are shown to be coated on surfaces of cell walls 5 of the carrier cells 3. The catalytic layers have a dual layer structure with a lower layer 6 coated directly over the cell walls 5 and an upper layer 7 coated over the lower layer 6 and directly exposed to exhaust gas flowing in the cell (exhaust gas passage) 3.

The lower layer 6 contains ceria or alumina based hollow oxide powder loaded with catalytic metal. On the other hand, the upper layer 7 contains solid oxide powder loaded with catalytic metal. The lower layer may contain, in addition to the hollow oxide powder, solid oxide powder loaded with catalytic metal.

Figure 3:
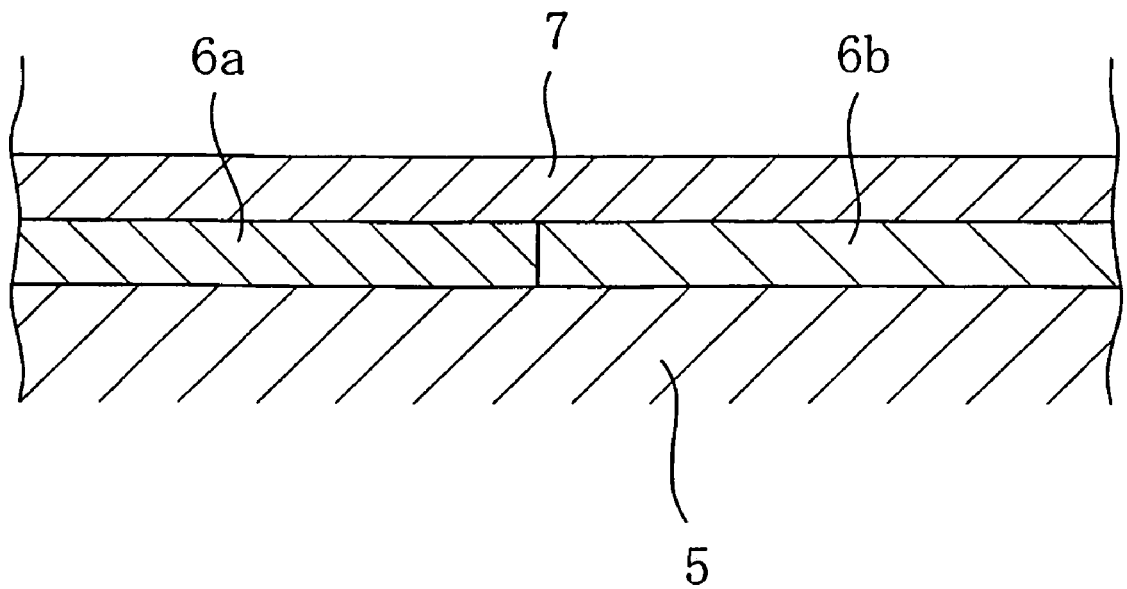
FIG. 3 is another cross sectional view showing a portion of the catalyst shown in FIG. 1.

FIG. 3 shows an embodiment in that the ceria or alumina based hollow oxygen powder loaded with catalytic metal is arranged in an upstream lower layer 6a in an exhaust gas flow direction of the carrier 2 while solid oxide powder loaded with catalytic metal is arranged in the downstream lower layer 6b.

Hereinafter, catalysts of examples of the present invention and comparative examples will be described.

CATALYST OF EXAMPLE 1-1

-Composition of Catalyst-

This example is one where solid Zr—Ce mixed oxide loaded with Rh is arranged in the upper layer 7 over the entire length of the carrier 2 while hollow La contained alumina powder loaded with Pt is arranged in the lower layer 6 over the entire length of the honeycomb shaped carrier 2.

The solid Zr—Ce mixed oxide powder loaded with Rh of the upper layer carries Rh on a solid Zr—Ce mixed oxide powder having mass ratio of $ZrO_{2/CeO2}$ being 75/25. Carrying amount of this Zr—Ce mixed oxide (carrying amount per one liter of the carrier 2, hereinafter the same definition applied) is 50 grams per liter (g/L) and Rh carrying amount is 0.15 g/L.

Figure 4:
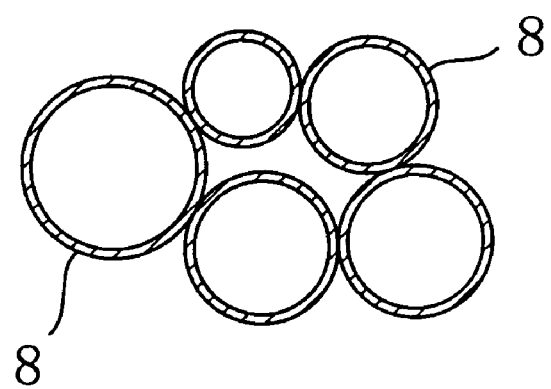
FIG. 4 is a cross sectional view showing hollow oxide powders contained in a lower layer of the catalyst in accordance with the present invention.

The hollow La contained alumina powder loaded with Pt in the lower layer is made by using solid La contained alumina powder loaded with Pt and forming it into a shape of a hollow shell 8 shown in FIG. 4. La/Al molar ratio of the La contained alumina is 5/100 and carrying amount of La contained alumina is 50 g/L and Pt carrying amount is 0.45 g/L.

-Preparation of Hollow Oxide Powder-

The hollow La contained alumina powder loaded with Pt is prepared in the example described below. Powder of poly vinyl butyral (PVB) having particle size or diameter of about 0.05-1.3 micron meters (μm) is put into poly vinyl alcohol (PVA) solution and stirred to get PVB solution. This PVB solution is added to the solid La contained alumina powder loaded with Pt to prepare mixed slurry. Ratio between the PVB solution and the La contained alumina powder loaded with Pt is for example such that the PVB solution is 60 mass % and that powder is 40 mass %.

The mixed slurry is dropped into a receptacle containing potassium chloride solution using funnel shaped dropping equipment to generate a sphere shaped particle which has the La contained alumina powder loaded with Pt coated on a surface of PVB particles.

The sphere shaped particles are deposited at the bottom of receptacle. Then, it is taken out, held at 150° C. for about two hours in the air atmosphere to dry it out, and held at 500° C. for about two hours in the air atmosphere for its calcinations. After the calcinations, PVB is thermo-decomposed and burned out, then sphere shaped hollow shells of the La contained alumina loaded with Pt are obtained. Its particle size or diameter is a level of 0.05-1.3 μm.

-Preparation of Catalyst (Coating of Catalyst Material Over Carrier)-

The hollow La contained alumina powder loaded with Pt as prepared above is mixed with binder and water to prepare slurry, into which the honeycomb shaped carrier is dipped. Then the carrier is pulled up and excess slurry is removed by blowing air to it. After that, the carrier is dried at 150° C. in the air atmosphere for two hours and calcined at 500° C. for two hours to form the lower layer.

The solid Zr—Ce mixed oxide powder loaded with Rh as described above is mixed with binder and water to prepare slurry, into which the honeycomb shaped carrier coated with the hollow La contained alumina powder loaded with Pt as prepared above is dipped. Then the carrier is pulled up and excess slurry is removed by blowing air to it. After that, the carrier is dried at 150° C. in the air atmosphere for two hours and calcined at 500° C. for two hours to form the upper layer.

CATALYST OF EXAMPLE 1-2

The upper layer 7 has the same composition as the example 1-1 (the solid Zr—Ce mixed oxide powder loaded with Rh is arranged over the entire length, the carrying amount of Zr—Ce mixed oxide is 50 g/L, Rh carrying amount is 0.15 g/L).

The lower layer, as shown in FIG. 3, is divided at the center of the honeycomb shaped carrier in the exhaust gas flow direction into the upstream lower layer 6a and the downstream lower layer 6b. In the upstream lower layer 6a, the hollow La contained alumina powder loaded with Pt is arranged which is same as in the lower layer of the example 1-1. In the downstream lower layer 6b, solid La contained alumina powder loaded with Pt, which was used as raw material for the hollow La contained alumina loaded with Pt in the example 1-1, is arranged. Carrying amounts of the lower layers are the same as in the example 1-1, i.e. 50 g/L for the La contained alumina and 0.45 g/L for Pt. A half of each of the amounts of La contained alumina and Pt is carried in the upstream lower layer 6a and the remaining half is carried in the downstream lower layer.

CATALYST OF COMPARATIVE EXAMPLE 1

The upper layer 7 has the same composition as the example 1-1 (the solid Zr—Ce mixed oxide powder loaded with Rh is arranged over the entire length, Zr—Ce mixed oxide carrying amount is 50 g/L, Rh carrying amount is 0.15 g/L).

In the lower layer over the entire length of honeycomb shaped carrier 2, solid La contained alumina powder loaded with Pt, which is same as in the downstream lower layer of the example 1-2, is carried so that carrying amounts are 50 g/L for the La contained alumina and 0.45 g/L for Pt.

CATALYST OF EXAMPLE 2-1

In the upper layer 7, as in that of the example 1-1, the solid Zr—Ce multi oxide powder loaded with Rh is arranged over the entire length of the honeycomb shaped carrier 2. Although the Zr—Ce multi oxide carrying amount is 50 g/L which is same as that of the example 1-1, the Rh carrying amount is 0.1 g/L different from the example 1. Mass ratio of $ZrO_2/CeO_2$ of the Zr—Ce mixed oxide is 75/25.

In terms of the lower layer 6, in stead of Pt employed in the example 1-1, the example 2-1 adopts Pd as catalytic metal. In other words, in the lower layer 6 over the entire length of the honeycomb shaped carrier 2, hollow La contained alumina powder loaded with Pd is arranged. This La contained alumina powder loaded with Pd is prepared by way of the same process as used for preparation of the hollow La contained alumina powder loaded with Pt of the example 1-1 using the solid La contained alumina powder loaded with Pd. The carrying amounts are 50 g/L for the La contained alumina and 0.9 g/L for Pd. Also, La/Al molar ratio of the La contained alumina is 5/100.

CATALYST OF EXAMPLE 2-2

The upper layer 7 has the same composition as the example 2-1 (the solid Zr—Ce mixed oxide powder loaded with Rh is arranged over the entire length, Zr—Ce mixed oxide carrying amount is 50 g/L, Rh carrying amount is 0.1 g/L).

In terms of the lower layer, it is divided into two parts in the same manner as the example 1-2. In its upstream lower layer 6a the hollow La contained alumina powder loaded with Pd is arranged and in the downstream lower layer 6b the above-mentioned solid La contained alumina powder loaded with Pd is arranged. Carrying amounts of the lower layers are the same as the example 2-1, i.e. 50 g/L for La contained alumina and 0.9 g/L for Pd, and a half amount of each of the La contained alumina and Pd is carried on the upstream lower layer 6a and the remaining half amount is carried on the downstream side lower layer 6b.

CATALYST OF COMPARATIVE EXAMPLE 2

The upper layer 7 has the same composition as the example 2-1 (the solid Zr—Ce mixed oxide powder loaded with Rh is arranged over the entire length, Zr—Ce mixed oxide carrying amount is 50 g/L, Rh carrying amount is 0.1 g/L).

In terms of the lower layer 6, over the entire length of the honeycomb shaped carrier 2, the same solid La contained Alumina loaded with Pd as the downstream lower layer 6b of the example 2-2 is carried so that carrying amounts are 50 g/L for the La contained alumina and 0.9 g/L for Pd.

CATALYST OF EXAMPLE 3-1

The upper layer has mixture of solid Zr—Ce mixed oxide powder loaded with Rh and solid La contained alumina powder loaded with Pt over the entire length of the honeycomb shaped carrier 2. The solid Zr—Ce mixed oxide powder loaded with Rh is the same as that of the upper layer of example 2-1, carrying amounts of which are 50 g/L for Zr—Ce mixed oxide and 0.1 g/L for Rh. On the other hand, the solid La contained alumina powder loaded with Pt of the upper layer 7 has La/Al molar ratio of 5/100, and its carrying amounts are 50 g/L for La contained alumina and 0.1 g/L for Pt.

The lower layer 6 has the same composition as the example 2-1 (the hollow La contained alumina powder loaded with Pd is arranged over the entire length, La contained alumina carrying amount is 50 g/L, Pd carrying amount is 0.9 g/L).

CATALYST OF EXAMPLE 3-2

The upper layer 7 has the same composition as the example 3-1 (the mixture of solid Zr—Ce mixed oxide powder loaded with Rh and solid La contained alumina powder loaded with Pt is arranged over the entire length, Zr—Ce mixed oxide carrying amount is 50 g/L, Rh carrying amount is 0.1 g/L, La contained alumina carrying amount is 50 g/L, Pt carrying amount is 0.1 g/L).

The lower layer is divided into two parts in the same manner as the example 1-2. The same hollow La contained alumina powder loaded with Pd as the lower layer of example 3-1 is arranged in the upstream lower layer 6a, and the solid La contained alumina powder loaded with Pd is arranged in the downstream lower layer 6b, as in the lower layer of the example 2-2. The carrying amounts of the lower layer are the same as the example 3-1, i.e. 50 g/L for the La contained alumina and 0.9 g/L. A half amount of each of the La contained alumina and Pd is carried on the upstream lower layer 6a and the remaining half amount is carried on the downstream side lower layer 6b, as in the lower layer of the example 2-2.

CATALYST OF COMPARATIVE EXAMPLE 3

The upper layer 7 has the same composition as the example 3-1 (the mixture of solid Zr—Ce mixed oxide powder loaded with Rh and solid La contained alumina powder loaded with Pt is arranged over the entire length, Zr—Ce mixed oxide carrying amount is 50 g/L, Rh carrying amount is 0.1 g/L, La contained alumina carrying amount is 50 g/L, Pt carrying amount is 0.1 g/L).

In the lower layer 6 over the entire length of honeycomb shaped carrier 2, the solid alumina powder loaded with Pd as in the downstream lower layer 6b of the example 3-2 is arranged so that La contained alumina is 50 g/L and Pd is 0.9 g/L.

-Evaluation of Catalysts-

For the catalysts of examples and comparative examples, aging process is taken which holds the catalysts at 1000° C. for 24 hours in air atmosphere. After the aging the catalysts are attached to a model gas flow reaction apparatus where model gas having a rich air fuel ratio (at temperature of 600° C.) is flowed for 20 minutes. Then a light off temperature T50 in terms of HC, CO and NOx is measured with a model gas described below. T50 is a gas temperature at an inlet of catalyst when purification rate reaches 50% as a temperature of the model gas flowing into the catalyst is gradually raised from a normal temperature to 500° C. The model gas has an air/fuel ratio (A/F=14.7±0.9). That is, the air/fuel ratio is compulsorily oscillated with an amplitude band of ±0.9 by constantly letting mainstream gas of A/F=14.7 flow and adding a certain amount of gas for the oscillation at a frequency of 1 Hz. Space velocity SV is 60000 h$^{-1}$ and temperature increase rate is 30° C./minute.

The result is shown in Table 1, where Solid Rh/Zr—Ce—O means the solid Zr—Ce mixed oxide powder loaded with Rh, Hollow Pt/La—Al$_2$O$_3$ means the hollow La contained alumina powder loaded with Pt, Solid Pt/La—Al$_2$O$_3$ means the solid La contained alumina powder loaded with Pt, Hollow Pd/La—Al$_2$O$_3$ means the hollow La contained alumina powder loaded with Pd, Solid Pd/La—Al$_2$O$_3$ means the solid La contained alumina powder loaded with Pd.

TABLE 1

| | | | T50 (° C.) | | |
|---|---|---|---|---|---|
| | Layer | Composition | HC | CO | NOx |
| Example 1-1 | Upper | Solid Rh/Zr—Ce—O | 342 | 337 | 348 |
| | Lower | Hollow Pt/La—Al$_2$O$_3$ | | | |
| Example 1-2 | Upper | Solid Rh/Zr—Ce—O | 346 | 341 | 351 |
| | Lower | Upstream: Hollow Pt/La—Al$_2$O$_3$ Downstream: Solid Pt/La—Al$_2$O$_3$ | | | |
| Comparative Example 1 | Upper | Solid Rh/Zr—Ce—O | 354 | 349 | 356 |
| | Lower | Solid Pt/La—Al$_2$O$_3$ | | | |
| Example 2-1 | Upper | Solid Rh/Zr—Ce—O | 314 | 306 | 318 |
| | Lower | Hollow Pd/La—Al$_2$O$_3$ | | | |
| Example 2-2 | Upper | Solid Rh/Zr—Ce—O | 319 | 310 | 322 |
| | Lower | Upstream: Hollow Pd/La—Al$_2$O$_3$ Downstream: Solid Pd/La—Al$_2$O$_3$ | | | |
| Comparative Example 2 | Upper | Solid Rh/Zr—Ce—O | 328 | 316 | 334 |
| | Lower | Solid Pd/La—Al$_2$O$_3$ | | | |
| Example 3-1 | Upper | Solid Rh/Zr—Ce—O and Solid Pd/La—Al$_2$O$_3$ | 308 | 300 | 315 |
| Example 3-2 | Upper | Solid Rh/Zr—Ce—O and Solid Pd/La—Al$_2$O$_3$ | 308 | 300 | 315 |
| | Lower | Hollow Pd/La—Al$_2$O$_3$ | | | |
| | Upper | Solid Rh/Zr—Ce—O and Solid Pd/La—Al$_2$O$_3$ | 312 | 303 | 321 |
| | Lower | Upstream: Hollow Pd/La—Al$_2$O$_3$ Downstream: Solid Pd/La—Al$_2$O$_3$ | | | |
| Comparative Example 3 | Upper | Solid Rh/Zr—Ce—O and Solid Pd/La—Al$_2$O$_3$ | 320 | 310 | 329 |
| | Lower | Solid Pd/La—Al$_2$O$_3$ | | | |

Comparing T50s for the example 1-1, example 1-2 and comparative example 1, in terms of any T50s for HC, CO and NOx, those for the examples 1-1 and 1-2 are lower than those for the comparative example 1. Accordingly, it can be seen that by arranging the solid oxide powder loaded with catalytic metal in the upper layer 7 and the hollow oxide powder loaded with catalytic metal in the lower layer 6 improvement of light off performance of catalyst can be obtained.

One of the reasons of the improved light off performance is considered that the upper layer 7 is more likely to receive heat from exhaust gas to raise its temperature because it is solid not hollow and that quick temperature rise of the upper layer can be obtained because the heat insulation effect of hollow oxide powder of lower layer 6 reduces heat transmission from the upper layer 7 to the honeycomb shaped carrier 2.

Also since the Zr—Ce mixed oxide loaded with Rh of the upper layer 7 promotes steam reforming reaction or partial oxidization reaction of HC, thereby generated more active decomposed product such as H$_2$ and partially oxidized HC is supplied to the lower layer 6, which improves catalytic reactivity of the La contained alumina loaded with Pt of the lower layer 6.

Other reason of the improved light off performance of the examples is considered that the abovementioned decomposed product is diffused in the lower layer 6. That is, since this decomposed product is smaller in size, it can more easily pass through the shell wall of the hollow oxide powder. Also the lower layer has bigger porous volume because of the hollow oxide powder which causes the abovementioned decomposed product more easily to diffuse. Therefore, it can be seen that in the catalysts of examples the catalytic metal in the lower layer 6 is effectively utilized for exhaust gas purification and the light off performance improves.

The example 1-2 has the hollow oxide powder in the upstream lower layer 6a and the solid oxide powder in the downstream lower layer 6b. In this case, since it shows better result than the comparative example 1 even though the result is a little bit of worse than the example 1-1 having the hollow oxide powder in the whole lower layer, it can be seen that the hollow oxide powder has the abovementioned effect even if just arranged in the upstream lower layer 6a.

The above points are proven by comparison between the example 2-1, the example 2-2 and the comparative example 2 as well as comparison between the example 3-1, the example 3-2 and the comparative example 3.

The example 2-1, the example 2-2 and the comparative example 2 adopt Pd as catalytic metal in the lower layer instead of Pt, and have better results respectively than the example 1-1, the example 1-2 and the comparative example 1. Accordingly, it can be seen that effect of the abovementioned oxide powder appears regardless catalytic metal elements and further that Pd is more advantageous than Pt in terms of improvement of light off performance. Also, since HC which causes poisoning of Pd is purified or converted into more reactive partially oxidized HC in the upper layer 7, the poisoning of Pd in the lower layer 6 is prevented.

The example 3-1, the example 3-2 and the comparative example 3 have mixture of the solid La contained alumina powder loaded with Pt with the solid Zr—Ce compound oxide powder loaded with Rh as in the example 2-1, 2-2 and the comparative example 2, in the upper layer 7. They show better results respectively than the example 2-1, the example 2-2 and the comparative example 2. This is considered to be because the oxidization reaction of HC and CO is promoted by the Pt catalyst in the upper layer 7, as a result, reduction of NOx efficiently proceeds simultaneously, as well as amount of partially oxidized HC generated from high molecular hydrocarbon in the upper layer is increased to improve purification reactivity of exhaust gas at the lower layer 6. Also although when the Rh catalyst in the upper layer 7 is oxidized, its catalytic performance generally deteriorates, in oxidizing atmosphere the Pt catalyst in the upper layer 7 promotes oxidizing reaction of hydrocarbon and the like, consequently since the reducing atmosphere is locally made, the oxidization of the Rh catalyst is prevented to be in advantage on maintenance of its activity.

It is needless to say that this invention is not limited to the embodiment described and the examples above and that various improvements and alternative designs are possible without departing from the substance of this invention as claimed in the attached claims. For example, although in the above embodiment the alumina based hollow oxide powder is arranged in the lower layer, rather the ceria based hollow powder may be arranged, further both of these hollow oxide powders of alumina based and ceria based may be layered or mixed and arranged in the lower layer. If the ceria based hollow oxide powder is adopted, its higher oxygen storage capacity may improve activity of catalyst to improve, or may make window of three way catalyst (air fuel ratio range where the three way catalyst effectively works) wider. Also in the lower layer, alumina based or ceria based hollow oxide powder loaded with Pd and alumina or ceria based hollow oxide powder loaded with Pt may be mixed and arranged.

The invention claimed is:

1. A catalytic converter coupled to exhaust gas comprising:
   a carrier;
   a lower catalytic layer positioned above said carrier and comprising hollow oxide powder loaded with catalytic metal, wherein the hollow oxide powder includes sphere shaped particles with outer shell walls, and wherein the sphere shaped particles are formed by gathering together or agglutinating fine crystals to form spaces in the shell walls, and where exhaust gas may pass through the spaces; and
   an upper catalytic layer positioned above said lower catalytic layer, directly exposed to the exhaust gas and comprising solid oxide powder loaded with catalytic metal;
   wherein said solid oxide powder is solid Zr—Ce mixed oxide powder; and
   wherein a Zr oxide mass is larger than a Ce oxide mass of the Zr—Ce mixed oxide powder.

2. The catalytic converter of claim 1, wherein said lower catalytic layer is coated directly over said carrier.

3. The catalytic converter of claim 1, wherein said upper catalytic layer is coated directly over said lower catalytic layer.

4. The catalytic converter of claim 1, wherein said lower catalytic layer further comprises another solid oxide powder loaded with catalytic metal.

5. The catalytic converter of claim 1, wherein said hollow oxide powder comprises ceria or alumina based oxide.

6. The catalytic converter of claim 1, wherein said hollow oxide powder comprises mixed oxide.

7. The catalytic converter of claim 6, wherein said mixed oxide is La contained alumina.

8. The catalytic converter of claim 1, wherein said solid oxide powder comprises ceria or alumina based oxide.

9. The catalytic converter of claim 1, wherein said solid oxide powder comprises mixed oxide.

10. The catalytic converter of claim 1, wherein said catalytic metal on said hollow oxide powder comprises Pt or Pd.

11. The catalytic converter of claim 10, wherein said catalytic metal on said solid oxide powder comprises Rh.

12. The catalytic converter of claim 11, wherein said catalytic metal on said solid oxide powder further comprises Pt.

13. A catalytic converter coupled to exhaust gas comprising:
    a carrier;
    an upstream lower catalytic layer positioned above said carrier in a predetermined range from an upstream end of said carrier in an exhaust gas flow direction and comprising hollow oxide powder loaded with catalytic metal, wherein the hollow oxide powder includes sphere shaped particles with outer shell walls, and wherein the sphere shaped particles are formed by gathering together or agglutinating fine crystals to form spaces in the shell walls, and where exhaust gas may pass through the spaces;
    a downstream lower catalytic layer positioned above said carrier downstream of said upstream lower catalytic layer and comprising solid oxide powder loaded with catalytic metal; and
    an upper catalytic layer positioned above said upstream and downstream lower catalytic layers, directly exposed to the exhaust gas and comprising solid oxide powder loaded with catalytic metal;
    wherein said solid oxide powder is solid Zr—Ce mixed oxide powder; and
    wherein a Zr oxide mass is larger than a Ce oxide mass of the Zr—Ce mixed oxide powder.

14. The catalytic converter of claim 13, wherein said upstream and downstream lower catalytic layers are coated directly over said carrier and said upper catalytic layer is coated directly over said upstream and downstream lower catalytic layers.

15. The catalytic converter of claim 13, wherein said catalytic metal of said upstream lower layer comprises Pd, said catalytic metal of said downstream lower layer comprises Pd, and said catalytic metal of said upper layer comprises Rh.

16. A catalytic converter coupled to exhaust gas comprising:
    a carrier;
    a lower catalytic layer positioned above said carrier and comprising hollow alumina powder loaded with Pd, wherein the alumina powder includes sphere shaped particles with outer shell walls, and wherein the sphere shaped particles are formed by gathering together or agglutinating fine crystals to form spaces in the shell walls, and where exhaust gas may pass through the spaces; and an upper catalytic layer positioned above said lower catalytic layer, directly exposed to the exhaust gas and comprising solid ceria powder loaded with Rh;

wherein said solid oxide powder is solid Zr—Ce mixed oxide powder; and wherein a Zr oxide mass is larger than a Ce oxide mass of the Zr—Ce mixed oxide powder.

17. The catalytic converter of claim 16, wherein said hollow alumina powder is hollow La contained alumina powder.

* * * * *